US007958068B2

(12) United States Patent
Smith et al.

(10) Patent No.: US 7,958,068 B2
(45) Date of Patent: Jun. 7, 2011

(54) METHOD AND APPARATUS FOR MODEL-SHARED SUBSPACE BOOSTING FOR MULTI-LABEL CLASSIFICATION

(75) Inventors: John R. Smith, New York, NY (US); Jelena Tesic, New York, NY (US); Rong Yan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 11/954,308

(22) Filed: Dec. 12, 2007

(65) Prior Publication Data

US 2009/0157571 A1     Jun. 18, 2009

(51) Int. Cl.
G06F 15/18     (2006.01)
G06E 1/00      (2006.01)
G06E 3/00      (2006.01)
G06G 7/00      (2006.01)

(52) U.S. Cl. .......................................... 706/20
(58) Field of Classification Search ............... 706/20
See application file for complete search history.

(56) References Cited

U.S. PATENT DOCUMENTS

| | | | |
|---|---|---|---|
| 6,253,169 B1 | 6/2001 | Apte et al. | |
| 6,324,532 B1 | 11/2001 | Spence et al. | |
| 6,453,307 B1 | 9/2002 | Schapire et al. | |
| 6,662,170 B1 | 12/2003 | Dom et al. | |
| 7,124,149 B2 * | 10/2006 | Smith et al. | 1/1 |
| 7,139,754 B2 | 11/2006 | Goutte et al. | |

OTHER PUBLICATIONS

Research on Modeling Traversing Features in Concurrent Software System, Su Yang; Zhou Xuan-Wu; Zhang Min-Qing; Computer Science and Software Engineering, 2008 International Conference on vol. 2 Digital Object Identifier: 10.1109/CSSE.2008.844 Publication Year: 2008 , pp. 81-84.*
The Effect of Target Vector Selection on the Invariance of Classifier Performance Measures, Sakk, E.; Schneider, D.J.; Myers, C.R.; Cartinhour, S.W.; Neural Networks, IEEE Transactions on, vol. 20 , Issue: 5 Digital Object Identifier: 10.1109/TNN.2008.2011809 Publication Year: 2009 , pp.745-757.*
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4 Digital Object Identifier: 10.1109/TPAMI.2008.110 Publication Year: 2009 , pp. 721-735.*
Multistream Articulatory Feature-Based Models for Visual Speech Recognition, Saenko, K.; Livescu, K.; Glass, J.; Darrell, T.; Pattern Analysis and Machine Intelligence, IEEE Transactions on vol. 31 , Issue: 9 Digital Object Identifier: 10.1109/TPAMI.2008.303 Publication Year: 2009 , pp. 1700-1707.*
R.E. Schapire, "Using output codes to boost multiclass learning problems," Proceedings of the Fourteenth International Conference on Machine Learning, pp. 1-9, 1997.

(Continued)

*Primary Examiner* — Michael Holmes
(74) *Attorney, Agent, or Firm* — Cantor Colburn LLP; Preston Young

(57) ABSTRACT

A computer program product includes machine readable instructions for managing data items, the instructions stored on machine readable media, the product including instructions for: initializing a plurality of base models; minimizing a joint loss function to select models from the plurality for a plurality of labels associated with the data items; and at least one of sharing and combining the selected base models to formulate a composite classifier for each label. A computer system and additional computer program product are provided.

20 Claims, 4 Drawing Sheets

OTHER PUBLICATIONS

D. Tao, et al.; "Asymmetric Bagging and Random Subspace for Support Vector Machines-Based Relevance Feedback in Image Retrieval." IEEE Trans. Pattern Anal. Mach. Intel., vol. 28 No. 7: pp. 1088-1099, (2006).

Tin Kam Ho, "The Random Subspace Method for Constructing Decision Forests," IEEE Trans. Pattern Anal. mach. Intel. 1998.

L. Breiman. "Random Forests," Statistics Department University of California Berkeley, CA 94720, Jan. 2001. pp. 1-33.

R. Ando and T. Zhang in the publication entitled "A Framework for Learning Predictive Structures from Multiple Tasks and Unlabeled Data," Journal of Machine Learning Research 6 (2005) 1817-1853.

Snoek, et al. "The MediaMill TRECVID 2004 Semantic Video Search Engine" MediaMill, University of Amsterdam (2004).

Yan, et al. "Mining relationship between video concepts using probabilistic graphical models," Proceedings of IEEE International Conference on Multimedia and Expo (ICME), 2006.

Barnard, et al. "Matching Words and Pictures". Journal of Machine Learning Research 3 (2003) 1107-1135.

Jeon, et al. "Automatic Image Annotation and Retrieval using Cross-Media Relevance Models" In Proceedings of the 26th annual international ACM SIGIR conference on Research and development in information retrieval, pp. 119-126, 2003.

Li, et al. "Real-time computerized annotation of pictures". In Proceedings of ACM Intl. conf. on Multimedia, pp. 911-920, 2006.

Kennedy, et al. "To Search or To Label? Predicting the Performance of Search-Based Automatic Image Classifiers". In proceedings of the 8th ACM international workshop on Multimedia information retrieval, pp. 24-258, New York, NY USA 2006.

Over, et al. "TREVID 2006-An Overview" Mar. 21, 2007. 32 pages.

Halaschek-Wiener, et al. "PhotoStuff—An Image Annotation Tool for the Semantic Web". In Proc. of 4th international semantic web conference, 2005.

* cited by examiner

METHOD AND APPARATUS FOR MODEL-SHARED SUBSPACE BOOSTING FOR MULTI-LABEL CLASSIFICATION

BACKGROUND OF THE INVENTION

1. Field of the Invention

The invention disclosed herein generally pertains to efficient information management. More particularly, the invention pertains to reducing redundancy in information management processes by combining and sharing models to create efficient learning systems for multimedia content annotation, management access or distribution.

2. Description of the Related Art

"Multi-label classification" refers to the simultaneous categorization of a given input into a set of multiple labels. The need for multi-label classification in large-scale learning systems is ever increasing. Examples include diverse applications such as music categorization, image and video annotation, text categorization and medical applications. Detecting multiple semantic labels from images based on their low-level visual features and automatically classifying text documents into a number of topics based on their textual context are some of the typical multi-label applications.

In reality, multi-label data collections may contain hundreds, thousands or millions of data items. Such items may be associated with as many different labels (however, the number of labels is typically some subset). Current multi-class learning solutions assume each data can only associate one single class. Accordingly, algorithms used are not efficient for handling multiple labels. Other existing multi-label learning approaches call for learning an independent classifier for every possible label using all the data samples and the entire feature space. As each label set contains some redundant information (e.g. label "mountain" is often overlapping with label "sky"), there is a great opportunity to improve the accuracy of the learning system that can simultaneously learn and predict multiple labels.

To speed up multi-label classification without performance degradation, one approach is to exploit the information redundancy in the learning space. To this end, researchers have proposed several ensemble learning algorithms based on random feature selection and data bootstrapping. Examples include those described by R. E. Schapire, "Using output codes to boost multiclass learning problems," Proceedings of the Fourteenth International Conference on Machine Learning, pages 313-321, San Francisco, Calif., USA, 1997. Morgan Kaufmann Publishers Inc. D. Tao, X. Tang, X. Li, and X. Wu; "Asymmetric bagging and random subspace for support vector machines-based relevance feedback in image retrieval." IEEE Trans. Pattern Anal. Mach. Intell., 28(7): 1088-1099, 2006; U.S. Pat. No. 6,453,307, "Method and apparatus for multi-class, multi-label information categorization," Robert E. Schapire, Yoram Singer; U.S. Pat. No. 6,662, 170 "System and method for boosting support vector machines," Byron Edward Dom, Jianchang Mao, Dmitry Pavlov; U.S. Pat. No. 7,139,754, "Method for multi-class, multi-label categorization using probabilistic hierarchical modeling," Cyril Goutte, Eric Gaussier.

The random subspace method (RSM), "The random subspace method for constructing decision forests," T. K. Ho., IEEE Trans. Pattern Anal. Mach. Intell. 1998, takes advantage of both feature space bootstrapping and model aggregation, and combines multiple base models learned on a randomly selected subset of the feature space. Although RSM considerably reduces the size of the feature space in each base model, and the model computation is more efficient than a classifier directly built on the entire feature space, certain problems are known.

Thus, by combining bagging (bootstrap aggregation) and RSM, Breiman has developed a more general algorithm called "random forest." Reference may be had to "Random Forests," Breiman, L., In Machine Learning, 45, 5-32 (2001). This technique aims to aggregate an ensemble of unpruned classification/regression trees using both bootstrapped training examples and random feature selection in the tree induction process. Random forest can be learned more efficiently than the baseline method, and it has empirically demonstrated superiority compared to a single tree classifier. But for the multi-label scenario, above algorithms need to learn an independent classifier for every label or assume that the underlying base models can produce multi-label predictions. However, they ignore an important fact that different labels are not independent of each other, or orthogonal to one another.

In the machine learning community, the idea of sharing the common information among multiple labels has been investigated by the methods called "multi-task learning." One example is described by R. Ando and T. Zhang in the publication entitled "A framework for learning predictive structures from multiple tasks and unlabeled data," Technical Report RC23462, IBM T. J. Watson Research Center, 45, 2004. These methods handle the multi-label classification problem by treating each label as a single task and generalizing the correlations among multiple task using neural networks, regularization learning methods, etc. These approaches often use the single-task learners in an iterative process and require a complex inference effort to estimate the task parameters.

The problem of exploring and leveraging the connections across labels have also been seen in many other research areas, such as image annotation and object recognition. However, the foregoing methods do not provide mechanisms to reduce the redundancy among labels and improve the computation efficiency.

The problem of exploring and leveraging the connections across labels has also been seen in many other research areas, such as neural networks (see U.S. Pat. No. 6,324,532, "Method and apparatus for training a neural network to detect objects in an image," issued to Clay Douglas Spence, Paul Sajda) and text categorization (see U.S. Pat. No. 6,253,169 "Method for improvement accuracy of decision tree based text categorization," issued to Chidanand Apte, Frederick J. Damerau, Sholom M. Weiss). One such example is the domain of image annotation and object recognition which aims to detect a number of scenes and objects in the given images. See also, for instance, "The Mediamill," C. Snoek, M. Worring, J. Geusebroek, D. Koelma, and F. Seinstra, TRECVID 2004. In the publication "Semantic Video Search Engine," Proceedings of TRECVID, 2004, a semantic value chain architecture including a multi-label learning layer called "context link" was proposed. In the document "Mining relationship between video concepts using probabilistic graphical model," R. Yan and A. G. Hauptmann., Proceedings of IEEE International Conference On Multimedia and Expo (ICME), 2006, the authors studied various multi-label relational learning approaches via a unified probabilistic graphical model representation.

However, these methods need to construct an additional computational intensive layer on top of the base models, and they do not provide any mechanisms to reduce the redundancy among labels other than utilizing the multi-label relations.

Accordingly, what are needed are techniques for reducing redundancy in information management processes by combining and sharing to create efficient systems for multimedia content annotation, management access or distribution.

SUMMARY OF THE INVENTION

Disclosed is a computer program product that includes machine readable instructions for managing data items, the instructions stored on machine readable media, the product including instructions for: initializing a plurality of base models; minimizing a joint loss function to select models from the plurality for a plurality of labels associated with the data items; and at least one of sharing and combining the selected base models to formulate a composite classifier for each label.

Also disclosed is a computing system for managing data items, the system including: at least one processor for processing a computer program product, the product including machine readable instructions for managing data items, the instructions stored on machine readable media coupled to the computing system and including instructions for: initializing a plurality of base models; minimizing a joint loss function to select models from the plurality for a plurality of labels associated with the data items; and at least one of sharing and combining the selected base models to formulate a composite classifier for each label.

Further disclosed is a computer program product that includes machine readable instructions for managing data items, the instructions stored on machine readable media, the product including instructions for: initializing a plurality of base models including at least one of: a learning algorithm, a decision tree model, a kNN model (k-Nearest Neighbors), a support vector machines (SVMs) model, a Gaussian mixture model and a model learned from multi-modal information; minimizing a joint loss function to select models from the plurality for a plurality of labels associated with the data items; and at least one of sharing and combining the selected base models to formulate a composite classifier for each label; wherein the multi-modal information includes at least one of visual information, audio information, text information and feature information, the feature information including at least one of color, texture, shape, appearance, sound, duration, arrangement, inter-relationship and order; wherein at least one of the plurality of base models is learned from a feature subspace, data samples and labeled data, the labeled data being derived from at least one of metadata, annotation, tagging, associated text or closed caption transcripts and crowd-sourcing; and wherein the joint loss function includes at least one of a weighting for a label, a sum of the learning losses for each label.

BRIEF DESCRIPTION OF THE DRAWINGS

The novel features believed characteristic of the invention are set forth in the appended claims. The invention itself, however, as well as a preferred mode of use, further advantages thereof, will best be understood by reference to the following detailed description of an illustrative embodiment when read in conjunction with the accompanying drawings, wherein:

DETAILED DESCRIPTION OF THE INVENTION

The teachings herein are directed toward automatic reduction of information redundancy in the data, feature and label space. This is accomplished by using computers to automatically find, share and combine the most useful learning models from the training data for multi-label learning. The approach scales to large datasets (such as real-world multimedia collections) with millions of entries and thousands of labels while keeping a high level of performance and discovering underlying context between multiple labels. As described herein, provided is a learning algorithm referred to as a "model-shared subspace boosting" algorithm (referred to as "MSSBoost").

In practice, MSSBoost merges ensemble learning, random subspace sampling, and models sharing techniques to automatically find, share and combine a number of random subspace models across multiple labels. MSSBoost is able to reduce the information redundancy in the label space by jointly optimizing loss functions over all possible labels. MSSBoost can be built on any base models without being limited to a specific type of classifiers. Since the base models are built on a small number of bootstrap data samples and a randomly selected feature subspace, the algorithm can scale to sizeable datasets with a large number of labels. The algorithm can also use a smaller number of base models to achieve the same classification performance as non-model-shared counterparts. As a by-product, the algorithm can automatically discover the underlying context between multiple labels, offering more insight for analysis of data collections.

Figure 1:
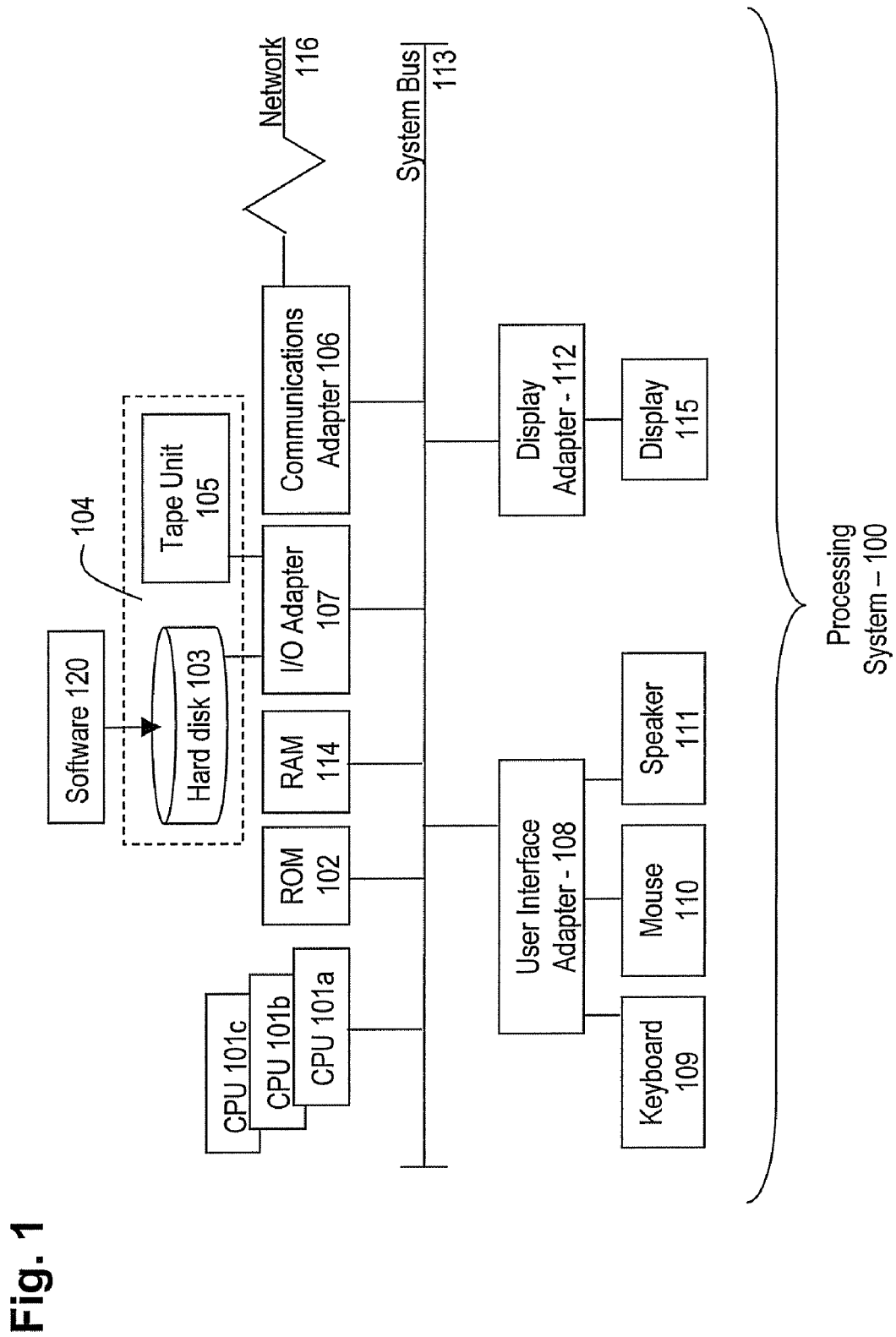
FIG. 1 illustrates one example of a processing system for practice of the teachings herein.

Referring now to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include components such as a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 104) for performing functions described herein. The instructions are referred to, among other things, as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The software 120 generally provides users with capabilities for information management. The commands may be native to (written to function within) computer application code programs (for example, C, C++, Perl, Java and others), other programs typically regarded as computing environments (UNIX, LINUX, DOS, and others) as well as other types of programs.

As a matter of convention herein, it is considered that the "software" 120 provides embodiments of computer implemented instructions and computer program products for management of bodies of data that generally include multi-modal information. The software 120 performs such tasks by combining and sharing multiple data and/or features of sampled models across multiple labels, and creates more efficient systems for multimedia content annotation, management access or distribution. The software 120 may include various components and structures as described herein.

As discussed herein, and for convenience, "multi-modal information" includes, for example, any one or more of visual information, audio information and text information. The multi-modal information may include information that is contained by or communicated by various features. Exemplary feature information includes: at least one of color, texture, shape, appearance, sound, duration, arrangement, inter-relationship (such as between objects in a visual format) and order (such as of letters in text). In this regard, it may be considered that the multi-modal information may exhibit various forms to provide a variety of content. Of course, the body of data that includes the multi-modal information may provide data regarding any topic or from any setting, such as visual (nature, sky, urban, studio), events (sports, entertainment), genre (cartoon, drama), type (animation, black-and-white), etc.

The base models determined for managing the data may be generally learned from labeled data, where the labels can come from metadata, annotation, tagging, associated text or closed caption transcripts, crowd-sourcing, selected data samples, selected feature subspace.

Figure 2:
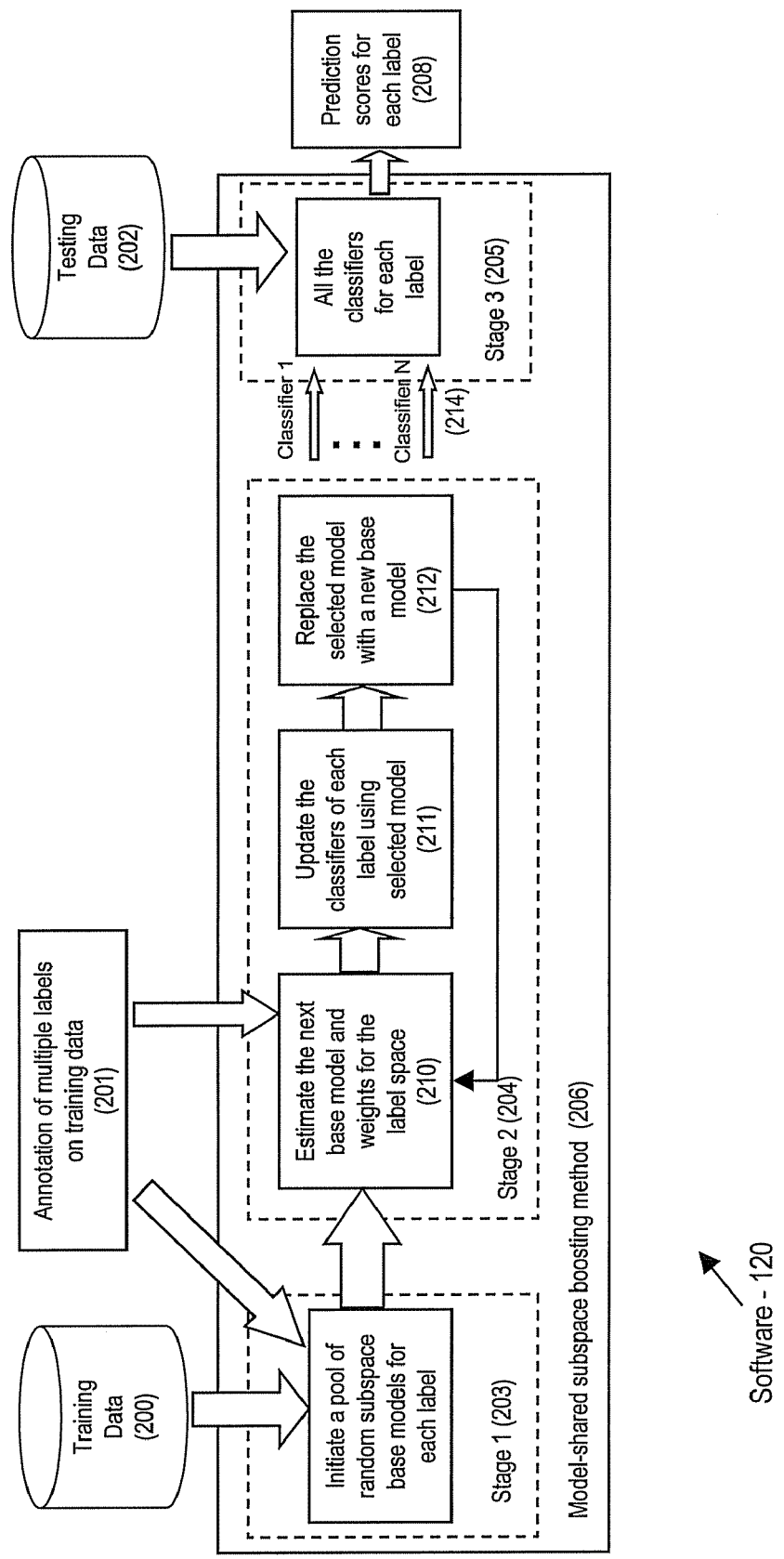
FIG. 2 is a schematic diagram showing an embodiment of a model-shared subspace boosting method and respective components.

Now with reference to FIG. 2, aspects of the software 120 are depicted. In this non-limiting example, aspects of data-flow and architecture for a model-shared subspace boosting algorithm for multi-label classification are depicted.

In this example, training data (200) are provided as data items used to learn (develop appropriate) classifiers. Each data item can be associated with features from multiple modalities such as text, visual and audio. Training data (200) are also annotated on a number of labels (201) predefined by users for the purposes of learning the feature patterns to distinguish positive-labeled and negative-labeled data. The labels (201) can be generated from various methods including annotation, tagging and crowd-sourcing. The label (201) can also cover base models of diverse topics such as visual (nature, sky, urban, studio), events (sports, entertainment), genre (cartoon, drama), type (animation, black-and-white), and so on. The model-shared subspace boosting method (104) analyzes the multi-label training data (200) and then merges ensemble learning, random subspace sampling, and models sharing techniques to automatically find, share and combine a number of random subspace models across multiple labels (201). Model-shared subspace boosting method (204) employs an iterative classifier update architecture, whereby the classifiers can be refined in each round in order to achieve a satisfactory level of performance.

Figure 3:
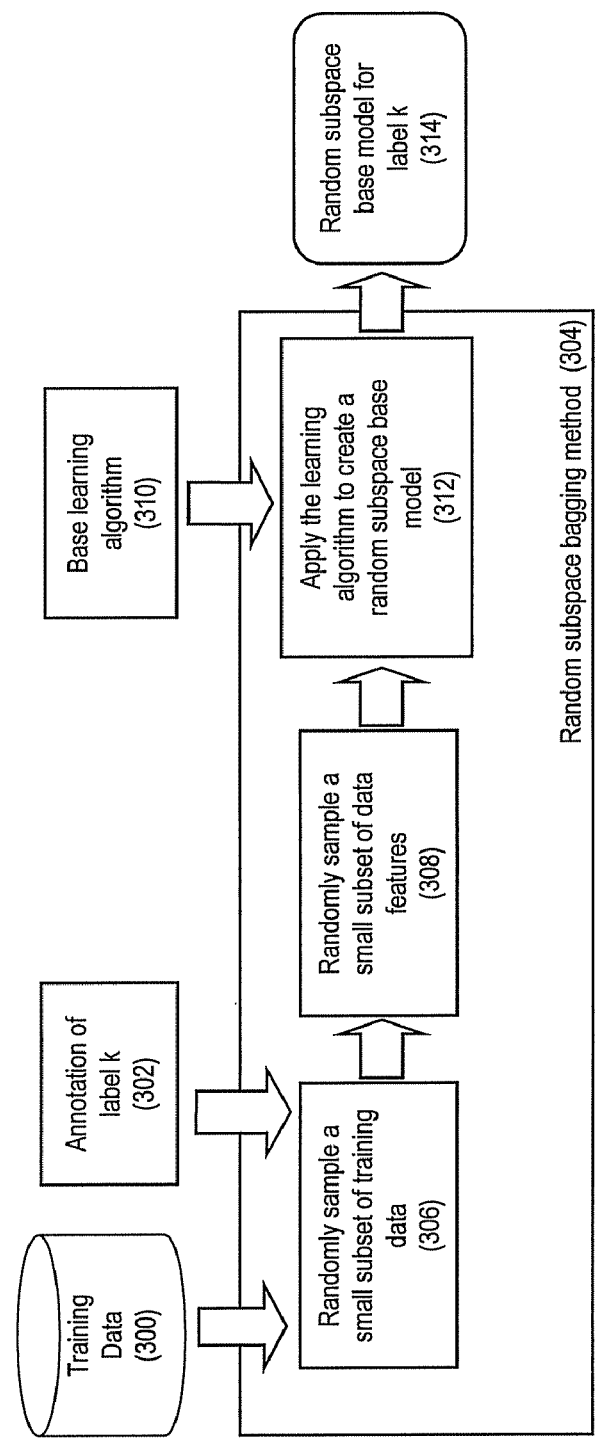
FIG. 3 is a schematic diagram depicting in more details how to initiate a pool of random subspace base models for each label.

In some embodiments, the model-shared subspace boosting method (206) of the software 120 includes three learning stages. In stage 1 (203), the random subspace base model initialization component is employed to initialize a set of base models for each label (201). The models can be learned from existing learning algorithms (such as decision trees, kNN (k-Nearest Neighbors), support vector machines (SVMs), Gaussian mixture models and so on) on randomly selected data samples and randomly selected feature subspace. The models can also be learned from multi-modal features such as color, texture, shape and skin color. For instance, one base model can be learned for each label using decision trees on random feature subspace and random data samples. To accomplish this goal, the model initialization component (203) is connected to one or more binary machine learning algorithms, where the algorithms generate classifiers on a single label and then provide binary prediction outputs for testing data. A more detailed explanation of the model initialization component is illustrated in FIG. 3.

In stage 2 (204), a recursive stage of the learning process includes three basic steps. In the first step (210), the base model estimation component searches the current model pool for the next base model for the label space. One way to choose the base model on the label space is to measure them via a joint loss function, which can be defined as the sum of the learning loss functions (such as hinge loss for support vectors machines, logit loss for logistic regression) over all the labels. The base model that can minimize the joint loss function is estimated to be the best fit over the entire label space. To this end, the software 120 defines a learning loss function for each label. By estimating the best model using joint loss function, the software 120 can also compute the associated combination weights for each label using numerical optimization approaches such as adaptive Newton methods. These weights can then be used in the following stages for model updating. In an alternative embodiment, the next base model can be found by choosing models in a round-robin manner and requesting users define the combination weights manually.

In a second step (211) of stage 2 (204), a classifier update component shares the selected base model to every label and combines it with the classifiers generated from last round. At the beginning of the method, the classifiers are initialized to output trivial constant values. In each round, all the classifiers combine each selected base model with their combination weights to form an updated classifier. The combination methods can be implemented as linear combination, probability multiplication and so on. For example, a base model learned from the label "outdoors" can be shared to the classifiers of the label "sky", "nature" and "mountain", because the label "outdoors" is highly related to the other labels and thus models learned from "outdoors" can potentially provide benefits for classifying other related labels. On the other hand, a classifier of "mountain" can combine multiple models including "outdoors", "sky" and "nature", which are all related labels to "mountain".

In the third step (212) of stage 2 (204), the base model replacement component discards the model that has been selected for the previous classifier combination stage, re-generates a new base model using the same label as the selected model, and places it back to the model pool. In a preferred embodiment, the new model is learned from the same learning configurations with the discarded model, including the same feature sampling ratio, data sampling ratio and the same learning algorithm. In another embodiment, the new model can be learned with different learning configurations which are automatically determined by the algorithm or manually determined by user. In this way, the algorithm still maintains the same number of base models in the model pool, but it can provide different outputs in each round.

After the third step (212), the system can iterate back to the base model estimation component (210) so as to refine the existing classifier to achieve a higher classification performance. The iteration is not stopped until a stopping criterion is satisfied. The definition of the stopping criteria can depend on the number of iterations, the classification error on the training data, the maximum computational resources and so on. For example, the stopping criterion can be defined as a minimal number of fifty (50) iterations before stopping. Once the stopping criterion is reached, the system goes to the final stage for further processing.

In the third stage (205) of model-shared subspace boosting method (204), the classifier output component maintains one composite classifier for each label in a storage device. Once testing data (202) are provided, these composite classifiers can be used to classify each data items to one or more given labels, and optionally assigns a "prediction confidence score" (220) for each label classification. Since the base models are always shared underlying the composite classifiers, a large amount of computational resources can be re-used across labels and thus reduce a huge fraction of the computation time. The design of the system allows better scalability and higher efficiency especially for the large-scale multi-label classification problem.

In reference to FIG. 3, a dataflow and architecture is depicted and further illustrates aspects of the modules (203) and (212) depicted in FIG. 2. Both modules of (203) and (212) are designed to generate one or more base models using the random subspace bagging method (304). The first stage (203) applies a random subspace bagging method (304) for each of the labels, while the third step (212) of the second stage (204) only applies the random subspace bagging method (304) for the label selected by the algorithm. In more detail, training data (300) are data items used to learn classifiers, where each data item can be associated with features from multiple modalities such as text, visual and audio. Training data (300) are also associated with one given label (302) predefined by users. Given the training data and the label, a data sampling component (306) first generate a small sampled set of the training data (300). The data sampling ratio can be defined by users or automatically adjusted by the algorithm. For example, if the data sampling ratio is set to 20%, only 20% of the training data are randomly chosen to form a new training collection. In the preferred embodiment, the sampling ratio of the positive data and that of the negative data are the same. An alternative embodiment is to set two different sampling ratios for positive and negative data so as to balance the learning distribution in the following stage.

Feature sampling component (308) randomly samples a subset of features from the entire feature space. Similar to data sampling stage, the feature sampling ratio can be defined by users or automatically adjusted by the algorithm. For example, if the feature sampling ratio is set to 10%, only 10% of the data features are randomly chosen to form a new training collection. An alternative embodiment is to sample the feature space based on the feature selection strategies rather than doing randomly sampling.

Then, a learning component (312) applies a learning algorithm to learn a subspace base model from the sampled collection. To this end, the learning component (312) needs to be connected to a binary machine learning algorithm (310), which can generate classifiers on a single label and then provide binary prediction outputs. The learning algorithm can be either the standard off-the-shelf learning algorithms such as decision trees kNN, support vector machines, Gaussian mixture models and so on, or other learning algorithms specifically developed for addressing a narrow-domain problem.

Figure 4:
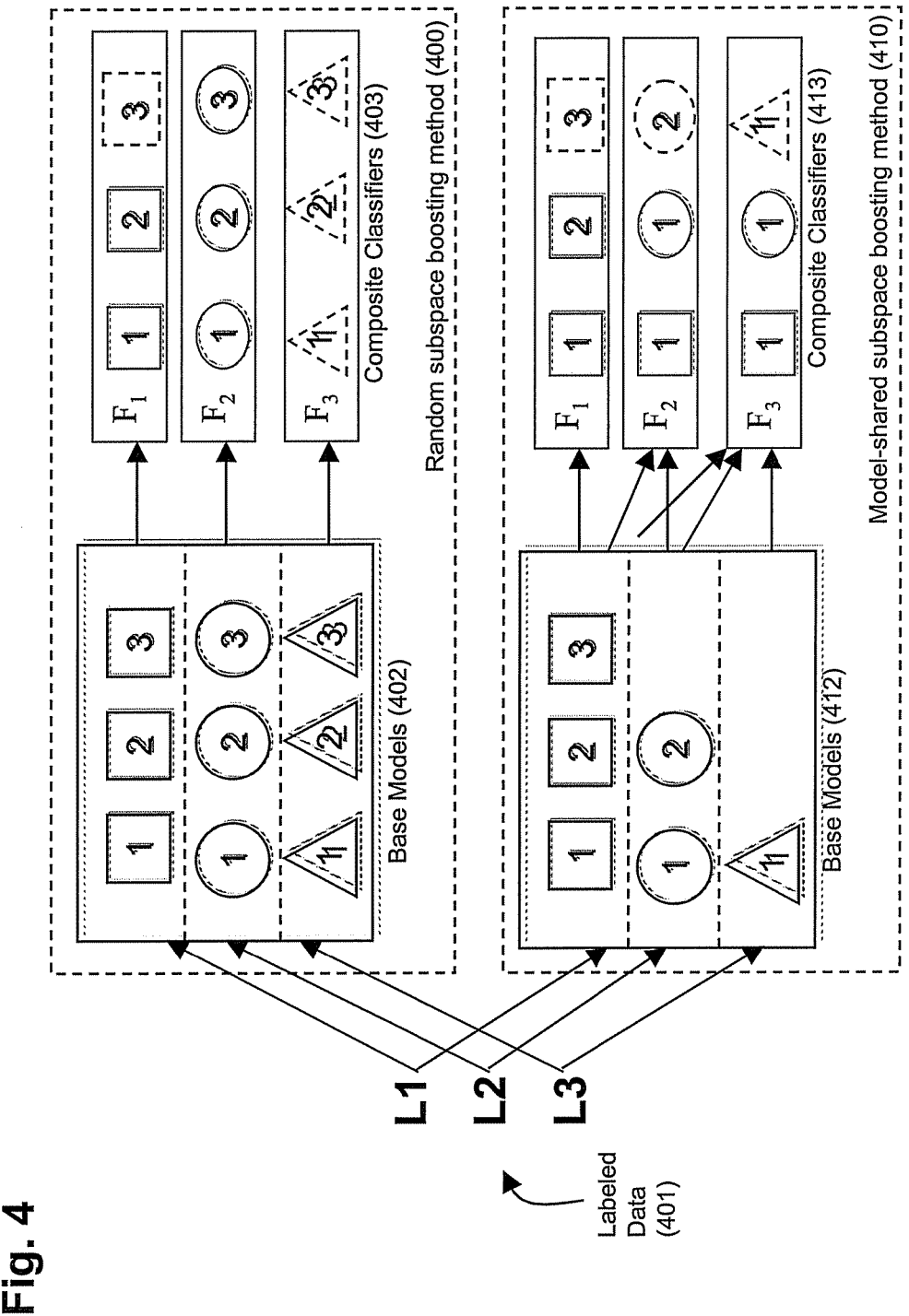
FIG. 4 illustrates aspects of a multi-label scenario.

FIG. 4 illustrates some of the advantages resulting from application of the software 120. In the baseline random subspace boosting method (400), models (402) are generated from labeled data (401) using the random subspace bagging method (304) for each of the labels in 400. Composite models (403) are generated from base models, per label only. In Model-shared subspace boosting method (410), base models (412) are generated using random subspace bagging method (304) only for the label selected by the algorithm. The algorithm may be aware of other base models (412) generated for other labels (401) and composite models (413), and thus combine this join set of base models for all labels.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising machine readable instructions for managing data items, the instructions stored on machine readable media, the product comprising instructions for:
   initializing a plurality of base models;
   minimizing a joint loss function to select models from the plurality for a plurality of labels associated with the data items; and
   at least one of sharing and combining the selected base models to formulate a composite classifier for each label.

2. The computer program product as in claim 1, wherein the plurality of base models comprises at least one of: a learning algorithm, a decision tree model, a kNN model (k-Nearest Neighbors), a support vector machines (SVMs) model and a Gaussian mixture model.

3. The computer program product as in claim 1, wherein at least one of the base models is learned from multi-modal information.

4. The computer program product as in claim 3, wherein the multi-modal information comprises at least one of visual information, audio information and text information.

5. The computer program product as in claim 3, wherein the multi-modal information comprises feature information.

6. The computer program product as in claim 5, wherein the feature information comprises at least one of color, texture, shape, appearance, sound, duration, arrangement, inter-relationship and order.

7. The computer program product as in claim 1, wherein at least one of the plurality of base models is adapted for modeling one of a visual topic, an event topic, a genre, and a type.

8. The computer program product as in claim 1, wherein at least one of the plurality of base models is learned from labeled data.

9. The computer program product as in claim 8, wherein the labeled data is derived from at least one of metadata, annotation, tagging, associated text or closed caption transcripts and crowd-sourcing.

10. The computer program product as in claim 1, wherein at least one of the plurality of base models is learned from selected data samples.

11. The computer program product as in claim 1, wherein at least one of the plurality of base models is learned from a feature subspace.

12. The computer program product as in claim 1, wherein the joint loss function comprises at least one of a weighting for a label, a sum of the learning losses for each label.

13. The computer program product as in claim 1, wherein certain ones of the plurality of the base models can be shared with a classifier.

14. The computer program product as in claim 1, wherein the composite classifier is a combination of base models for generating prediction outputs.

15. The computer program product as in claim 1, wherein a model-shared subspace boosting is customized for a classification objective.

16. A computing system for managing multi-mode data items, the system comprising: at least one processor for processing a computer program product, the product comprising machine readable instructions for managing data items, the instructions stored on machine readable media coupled to the computing system, the product comprising instructions for: initializing a plurality of base models; minimizing a joint loss function to select models from the plurality for a plurality of labels associated with the data items; and at least one of sharing and combining the selected base models to formulate a composite classifier for each label.

17. A computer program product comprising machine readable instructions for managing data items, the instructions stored on machine readable media, the product comprising instructions for:
   initializing a plurality of base models comprising at least one of: a learning algorithm, a decision tree model, a kNN model (k-Nearest Neighbors), a support vector machines (SVMs) model, a Gaussian mixture model and a model learned from multi-modal information;
   minimizing a joint loss function to select models from the plurality for a plurality of labels associated with the data items; and
   at least one of sharing and combining the selected base models to formulate a composite classifier for each label;
   wherein the multi-modal information comprises at least one of visual information, audio information, text information and feature information, the feature information comprising at least one of color, texture, shape, appearance, sound, duration, arrangement, inter-relationship and order;
   wherein at least one of the plurality of base models is learned from at least one of a feature subspace, selected data samples and labeled data, the labeled data being derived from at least one of metadata, annotation, tagging, associated text or closed caption transcripts and crowd-sourcing; and
   wherein the joint loss function comprises at least one of a weighting for a label, a sum of the learning losses for each label.

18. The computer program product as in claim 17, wherein certain ones of the plurality of the base models can be shared with a classifier.

19. The computer program product as in claim 17, wherein the composite classifier is a combination of base models for generating prediction outputs.

20. The computer program product as in claim 17, wherein a model-shared subspace boosting is customized for a classification objective.

* * * * *